(12) United States Patent
Davies

(10) Patent No.: US 11,596,999 B2
(45) Date of Patent: Mar. 7, 2023

(54) PEX EXPANSION TOOL

(71) Applicant: MILWAUKEE ELECTRIC TOOL CORPORATION, Brookfield, WI (US)

(72) Inventor: Peter J. Davies, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 181 days.

(21) Appl. No.: 16/795,727

(22) Filed: Feb. 20, 2020

(65) Prior Publication Data

US 2020/0261958 A1    Aug. 20, 2020

Related U.S. Application Data

(60) Provisional application No. 62/807,878, filed on Feb. 20, 2019.

(51) Int. Cl.
*B21D 41/02* (2006.01)
*B29C 57/06* (2006.01)
(Continued)

(52) U.S. Cl.
CPC ............ *B21D 41/028* (2013.01); *B29C 57/06* (2013.01); *B29K 2023/0691* (2013.01); *B29L 2023/22* (2013.01)

(58) Field of Classification Search
CPC .... B21D 41/028; B21D 41/021; B29C 57/06; B29C 57/045; B29K 2023/0691; B29L 2023/22

See application file for complete search history.

(56) References Cited

U.S. PATENT DOCUMENTS

| 1,404,819 A | 1/1922 | Wiedeke |
| 1,752,408 A | 4/1930 | Zein |

(Continued)

FOREIGN PATENT DOCUMENTS

| CN | 201346602 Y | 11/2009 |
| CN | 204018564 U | 12/2014 |

(Continued)

OTHER PUBLICATIONS

European Patent Office Partial Search Report for Application No. 20158531.2 dated Jun. 18, 2020 (13 pages).

(Continued)

*Primary Examiner* — Timothy Kennedy
*Assistant Examiner* — Olukorede Esan
(74) *Attorney, Agent, or Firm* — Michael Best & Friedrich LLP

(57) ABSTRACT

An expansion tool includes a working element configured to expand an end of a tube. The working element includes a plurality of jaws movable between a closed position and an expanded position. The expansion tool also includes first mandrel with a first contact surface and a second mandrel coupled to the first mandrel. The second mandrel has a second contact surface. The first mandrel and the second mandrel are movable together relative to the jaws between a retracted position and an extended position. The first contact surface and the second contact surface are engageable with the jaws to move the jaws from the closed position toward the expanded position in response to movement of the first mandrel and the second mandrel from the retracted position toward the extended position.

20 Claims, 2 Drawing Sheets

(51) Int. Cl.
*B29K 23/00* (2006.01)
*B29L 23/00* (2006.01)

(56) References Cited

U.S. PATENT DOCUMENTS

| | | |
|---|---|---|
| 2,085,447 A | 6/1937 | Plaine |
| 2,725,918 A | 12/1955 | Deshler |
| 2,737,996 A | 3/1956 | Toth |
| 2,835,307 A | 5/1958 | Jorgensen |
| 2,999,529 A | 11/1958 | Rast |
| 3,550,424 A | 12/1970 | Rast |
| 3,677,684 A | 7/1972 | Platz |
| 3,753,635 A | 8/1973 | Barnett |
| 3,857,666 A | 12/1974 | Barnett |
| 3,861,847 A | 1/1975 | Barnett |
| 3,888,102 A | 6/1975 | Nigido |
| 3,940,227 A | 2/1976 | Strasser |
| 3,947,950 A | 4/1976 | Adams |
| 4,034,591 A | 7/1977 | Rothenberger |
| 4,107,249 A | 8/1978 | Murai et al. |
| 4,144,735 A | 3/1979 | Rothenberger |
| 4,154,083 A * | 5/1979 | Rothenberger ...... B21D 41/026 72/393 |
| 4,397,173 A | 8/1983 | Eftefield et al. |
| 4,425,783 A | 1/1984 | Rast |
| 4,603,890 A | 8/1986 | Huppee |
| 4,733,551 A | 3/1988 | Bryant et al. |
| 4,735,078 A | 4/1988 | Wesebaum |
| 4,890,472 A | 1/1990 | Rothenberger |
| 5,046,349 A | 9/1991 | Velte |
| 5,090,226 A | 2/1992 | Takeoka et al. |
| 5,090,230 A | 2/1992 | Koskinen |
| 5,135,268 A | 8/1992 | McNaughton et al. |
| 5,243,845 A | 9/1993 | Velte |
| 5,261,709 A | 11/1993 | McNaughton et al. |
| 5,704,244 A | 1/1998 | Halasz et al. |
| 5,727,414 A | 3/1998 | Halasz et al. |
| 5,744,085 A | 4/1998 | Soberg |
| 5,879,033 A | 3/1999 | Hansel et al. |
| 5,943,891 A | 8/1999 | Takagi et al. |
| 6,199,915 B1 | 3/2001 | Becker |
| 6,783,160 B2 | 8/2004 | Rowley |
| 6,862,766 B2 | 3/2005 | Geurts |
| 7,014,214 B2 | 3/2006 | Kaneko |
| 7,065,995 B2 | 6/2006 | Frenken |
| 7,128,560 B2 | 10/2006 | Tandart |
| 7,325,436 B2 | 2/2008 | Cheng |
| 7,490,499 B2 | 2/2009 | Suzuki et al. |
| 7,516,990 B2 | 4/2009 | Jamison et al. |
| 7,681,636 B2 | 3/2010 | Roggeband et al. |
| 7,735,877 B2 | 6/2010 | Ito et al. |
| 7,806,213 B2 | 10/2010 | Inoue et al. |
| 7,922,475 B2 | 4/2011 | Gueit |
| 8,302,448 B2 | 11/2012 | Woelcken et al. |
| 8,303,295 B2 | 11/2012 | Gueit |
| 8,371,409 B2 | 2/2013 | Inoue et al. |
| 8,511,133 B1 | 8/2013 | Chen |
| 8,517,715 B2 | 8/2013 | Thorson et al. |
| 8,534,711 B2 | 9/2013 | Inoue et al. |
| 8,562,331 B2 | 10/2013 | Schramm et al. |
| 8,763,439 B2 | 7/2014 | Thorson et al. |
| 9,027,966 B2 | 5/2015 | Altmann et al. |
| 9,089,889 B2 | 7/2015 | Kohnen |
| 9,248,617 B2 | 2/2016 | Lundequist et al. |
| 9,808,852 B2 | 11/2017 | Frenken |
| 9,862,137 B2 | 1/2018 | Dickert et al. |
| 9,914,260 B2 | 3/2018 | Ellice |
| 9,975,289 B2 | 5/2018 | Li et al. |
| 9,993,961 B2 | 6/2018 | Dickert et al. |
| 10,000,007 B2 | 6/2018 | Dickert et al. |
| 10,195,783 B2 | 2/2019 | Dickert et al. |
| 10,406,586 B2 | 9/2019 | Frenken |
| 2005/0093298 A1 | 5/2005 | Takayanagi |
| 2006/0201228 A1 | 9/2006 | Rothenberger |
| 2007/0057393 A1 | 3/2007 | Hartmann et al. |
| 2008/0122222 A1 | 5/2008 | Sheppard |
| 2008/0160130 A1 | 7/2008 | Gueit |
| 2010/0308503 A1* | 12/2010 | Schramm ............ B21D 41/026 264/312 |
| 2011/0239674 A1 | 10/2011 | Defilippi |
| 2018/0029286 A1 | 2/2018 | Li et al. |
| 2019/0351605 A1 | 11/2019 | Trickle |
| 2020/0261959 A1 | 8/2020 | Wekwert et al. |

FOREIGN PATENT DOCUMENTS

| | | |
|---|---|---|
| CN | 107838304 A | 3/2018 |
| CN | 207308769 U | 5/2018 |
| DE | 497609 C | 5/1930 |
| DE | 2800079 A1 | 7/1978 |
| DE | 3439522 A1 | 8/1985 |
| DE | 4003994 A1 | 8/1991 |
| DE | 4005474 A1 | 9/1991 |
| DE | 19730054 C1 | 3/1999 |
| DE | 19924695 A1 | 11/2000 |
| DE | 19963885 C1 | 5/2001 |
| DE | 10063517 A1 | 7/2002 |
| DE | 20301139 U1 | 6/2004 |
| DE | 102005033482 A1 | 1/2007 |
| DE | 102006015368 A1 | 10/2007 |
| DE | 202008002265 U1 | 4/2008 |
| DE | 202008002266 U1 | 4/2008 |
| DE | 102007053518 A1 | 5/2009 |
| DE | 102008061441 A1 | 7/2009 |
| DE | 102008064320 A1 | 6/2010 |
| DE | 102013208330 A1 | 11/2014 |
| EP | 234283 A1 | 9/1987 |
| EP | 0397570 A1 | 11/1990 |
| EP | 0462719 A2 | 12/1991 |
| EP | 0567742 A2 | 11/1993 |
| EP | 0718057 A2 | 6/1996 |
| EP | 0878287 A1 | 11/1998 |
| EP | 0967427 A2 | 12/1999 |
| EP | 1118401 A1 | 7/2001 |
| EP | 1278001 A2 | 1/2003 |
| EP | 1930640 A1 | 6/2008 |
| EP | 2090384 A2 | 8/2009 |
| EP | 3520923 A1 | 8/2019 |
| FR | 2451235 A1 | 10/1980 |
| FR | 2645052 A1 | 10/1990 |
| GB | 1485098 A | 9/1977 |
| GB | 1524149 A | 9/1978 |
| WO | 8800503 A1 | 1/1988 |
| WO | 1996020798 A1 | 7/1996 |
| WO | 1996040457 A2 | 12/1996 |
| WO | 0189736 A1 | 11/2001 |

OTHER PUBLICATIONS

European Patent Office Extended Search Report for Application No. 20158531.2 dated Sep. 18, 2020 (12 pages).

* cited by examiner

PEX EXPANSION TOOL

CROSS-REFERENCE TO RELATED APPLICATIONS

This application claims priority to U.S. Provisional Patent Application No. 62/807,878, filed Feb. 20, 2019, the entire content of which is incorporated herein by reference.

FIELD OF THE INVENTION

The present disclosure relates to pipe and tubing expansion tools. More particularly, the present disclosure relates to PEX (cross-linked polyethylene) expansion tools.

BACKGROUND OF THE INVENTION

PEX tubing is commonly used in plumbing applications as a substitute for copper pipe. PEX tubing can be coupled to fittings in various ways. Crimp rings or clamp rings can be compressed onto the outside of PEX tubing over a fitting to couple the PEX tubing to the fitting. Alternatively, the PEX tube can be expanded and the fitting inserted into the expanded end of the PEX tube. The PEX tube elastically recovers around the fitting to form a tight connection. Tools used to expand PEX tube for this purpose are referred to as PEX expansion tools.

SUMMARY OF THE INVENTION

The present invention provides, in one aspect, an expansion tool including a working element configured to expand an end of a tube, the working element including a plurality of jaws movable between a closed position and an expanded position, a first mandrel including a first contact surface, and a second mandrel coupled to the first mandrel, the second mandrel including a second contact surface. The first mandrel and the second mandrel are movable together relative to the jaws between a retracted position and an extended position. The first contact surface and the second contact surface are engageable with the jaws to move the jaws from the closed position toward the expanded position in response to movement of the first mandrel and the second mandrel from the retracted position toward the extended position.

The present invention provides, in another aspect, an expansion tool including a housing, a motor supported by the housing, a mandrel, and a drive mechanism configured to convert a rotational input from the motor into translational movement of the mandrel between an extended position and a retracted position. The expansion tool is configured to perform cycles of axially extending and retracting the mandrel, and an elapsed time for one cycle of moving the mandrel from the retracted position to the extended position and back to the retracted position defines a cycle time of the expansion tool. The cycle time is one second or less.

The present invention provides, in another aspect, an expansion tool including a housing, a motor supported by the housing, a mandrel, and a drive mechanism configured to convert a rotational input from the motor into translational movement of the mandrel between an extended position and a retracted position. The expansion tool is configured to perform cycles of axially extending and retracting the mandrel. The mandrel is movable from the retracted position to the extended position in a first time period, and the mandrel is movable from the extended position to the retracted position in a second time period different than the first time period. The first time period and the second time period collectively define a cycle time of the expansion tool.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
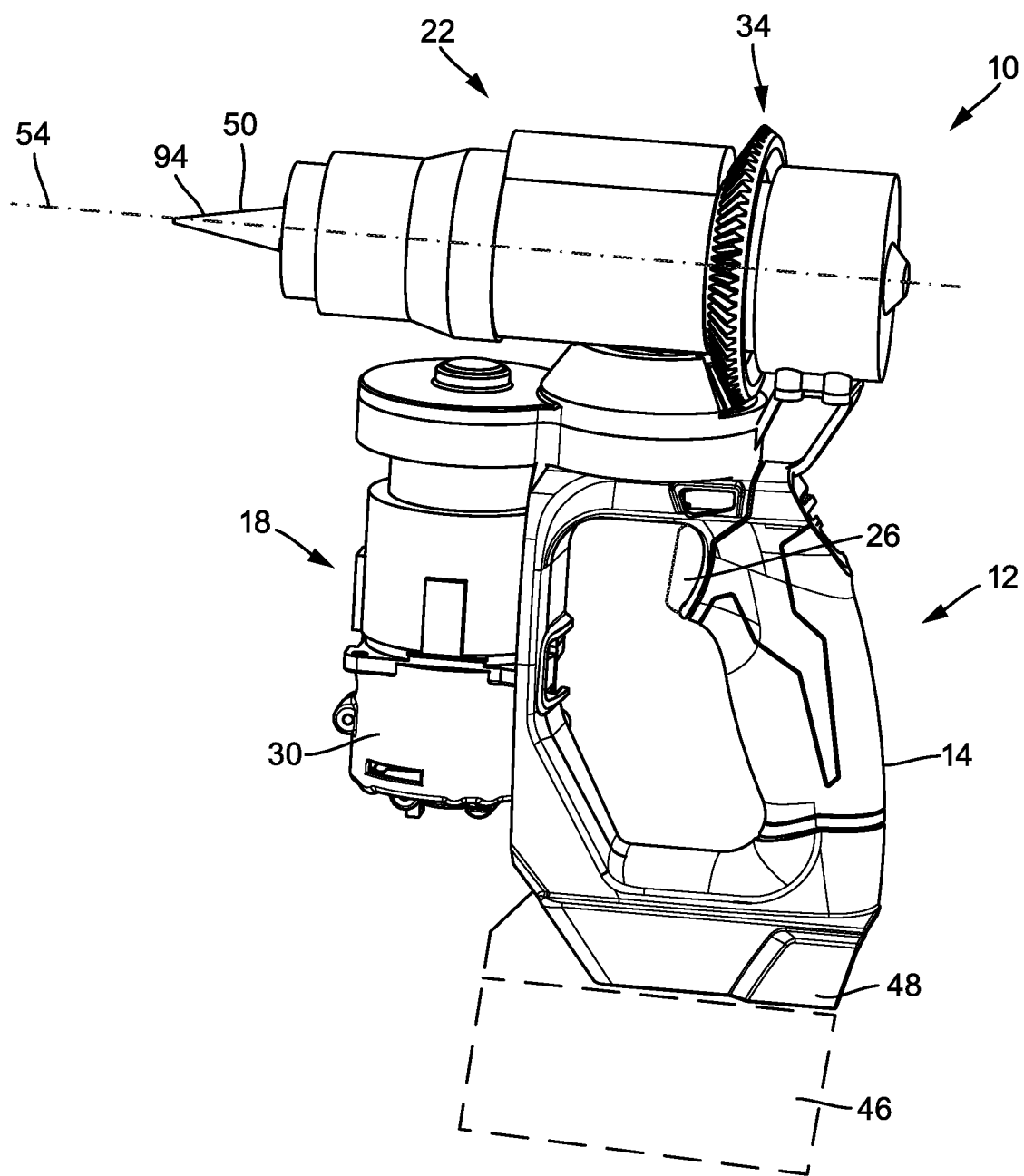
FIG. 1 is a perspective view of an expansion tool according to an embodiment of the present disclosure.

FIG. 1 illustrates an expansion tool 10 usable to expand PEX tubing prior to inserting a fitting. The expansion tool 10 includes a housing 12 (only a portion of which is illustrated in FIG. 1) with a handle 14 configured to be gripped by a user during operation of the expansion tool 10. The housing 12 supports a motor casing 18 and a drive casing 22. An actuator 26 (e.g., a trigger) for operating the expansion tool 10 is positioned on the handle 14.

Figure 2:
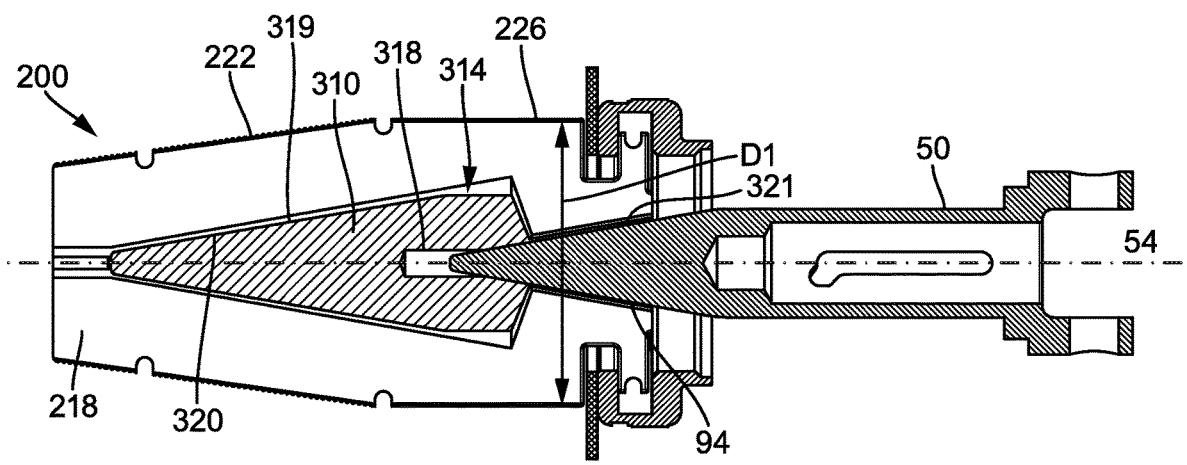
FIG. 2 is a perspective view illustrating a working element according to one embodiment of the present disclosure, usable with the expansion tool of FIG. 1 and illustrated in an initial state.

Referring to FIG. 2, a motor 30 is supported within the motor casing 18, and a drive mechanism 34 is supported at least partially within the drive casing 22. In the illustrated embodiment, a battery 46 provides electrical power to the motor 30 (e.g., in response to the actuation of the actuator 26). The battery 46 is removably coupled to a battery receptacle 48 located at a base of the handle 14.

With reference to FIG. 1, the drive mechanism 34 converts a rotational input from the motor 30 into a translational movement of a mandrel 50 along a mandrel axis 54. The mandrel 50 includes a conical outer surface 94 engageable with a working element 200 (FIGS. 2 and 3) that is configured to be attached to the expansion tool 10. More specifically, the mandrel 50 is driven in a reciprocating manner, to expand and retract the working element 200. The working element 200 is movable from an initial or closed position (illustrated in FIG. 2) toward an expanded position (FIG. 3) in response to movement of the mandrel 50 along the axis 54 from a retracted position toward an extended position. The working element 200 may be biased toward the initial position by a spring element (e.g., an o-ring), such that the working element 200 returns to the initial position when the mandrel 50 retracts.

Figure 3:
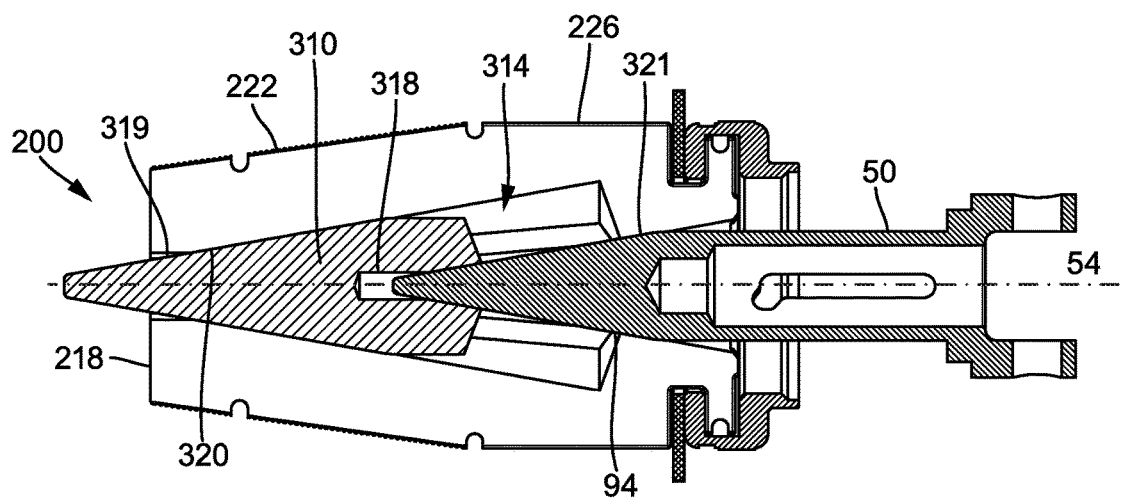
FIG. 3 is a perspective view illustrating the working element of FIG. 2 in an expanded state.

Referring to FIGS. 2 and 3, the working element 200 includes a plurality of jaws 218, each having an exterior side with a tapered portion 222 and a sizing portion 226. When the working element 200 is in the closed or retracted position (FIG. 2), adjacent jaws 218 abut one another, and the tapered portions 222 of the jaws 218 collectively define a frusto-conical profile. The sizing portions 226 of each of the jaws 218 collectively define a cylindrical profile with a diameter or maximum cross-sectional dimension D1. The dimension D1 is sized for proper expansion of PEX tubing of a nominal size when the jaws 218 are inserted into an end of the PEX tubing.

The illustrated working element 200 further includes a second mandrel 310 at least partially received within an internal cavity 314 defined by the inner sides of the jaws 218. Referring to FIG. 2, when the working element 200 is in the closed position, the second mandrel 310 is positioned entirely within the internal cavity 314. The mandrel 50 of the expansion tool 10 (i.e. the first mandrel) extends into the working element 200 and is coupled to the second mandrel 310. In the illustrated embodiment, an end of the first mandrel 50 is received within a bore 318 in the second mandrel 310 to couple the first mandrel 50 to the second mandrel 310.

In some embodiments, the mandrel 50, and/or the working element 200 may be configured to rotate about the mandrel axis 54 before, during, or after expansion of the working element 200. For example, the expansion tool 10 may include a rotation assembly with a rotation collar as described and illustrated in U.S. Pat. No. 8,763,439 to Milwaukee Electric Tool Corporation, the entire content of which is incorporated herein by reference.

The illustrated expansion tool 10 includes cycles of axially extending and retracting the mandrel 50, which may include reversing the operating direction of the motor 30 in some embodiments. In other embodiments, the expansion tool 10 may perform cycles of axially extending and retracting the mandrel 50 in response to continuous operation of the motor 30 in a single operating direction. In such embodiments, the expansion tool 10 may include a motion converting mechanism (such as a cam and follower mechanism) configured to convert a rotational input from the motor 30 into reciprocating movement of the mandrel 50.

The expansion tool 10 includes a controller (not shown) configured to control operation of the expansion tool 10 (e.g., energize the motor 30 to rotate the driving mechanism 34 a desired number of cycles, reverse the operating direction of the motor 30, etc.). In operation, the working element 200 (FIGS. 2-3) is inserted into an end of a segment of PEX tubing to be expanded. The tapered portion 222 abuts an interior wall of the PEX tubing. The operator depresses the actuator 26, and the motor 30 and the drive mechanism 34 perform a cycle of axially extending and retracting the mandrel 50, thereby expanding and contracting the jaws 218 of the working element 200.

More specifically, the motor 30 drives the drive mechanism 34 in a first direction (i.e. a forward direction) to extend the first mandrel 50 (FIG. 1). As the first mandrel 50 is extended, it engages the second mandrel 310 to move the second mandrel 310 forward (i.e. to the left in FIGS. 2-3) along the axis 54 within the internal cavity 314. The second mandrel 310 includes a tapered outer surface 319 that engages a corresponding internal surface 320 on each of the jaws 218 to urge the jaws 218 radially outward. The exterior surface 94 of the first mandrel 50, which is spaced from the tapered outer surface 319 of the second mandrel 310 along the axis 54, is engageable with a corresponding internal surface 321 adjacent the rear end of each of the jaws 218. Thus, the working element 200 engages the jaws 218 at two separate, spaced contact areas. By engaging the jaws 218 at two separate contact areas, the jaws 218 are expanded more evenly. After expanding the jaws 218, the motor 30 drives the drive mechanism 34 in a second direction (i.e. a reverse direction) to retract the mandrel 50, allowing the jaws 218 to retract (e.g., under the influence of a spring).

The elapsed time for a cycle of axially extending and retracting the mandrel 50 defines a cycle time TC of the expansion tool 10. More specifically, the mandrel 50 is movable from a retracted position to an extended position in a first time period T1 in response to operation of the motor 30 in the first direction. The mandrel 50 is movable from the extended position to the retracted position in a second time period T2 in response to operation of the motor 30 in the second direction. The first time period T1 and the second time period T2 collectively define the cycle time TC of the expansion tool 10.

In the illustrated embodiment, the cycle time TC is about one second or less. In some embodiments, the second time period T2 is less than the first time period T1. That is, the mandrel 50 retracts at a faster rate than it extends to take advantage of the reduced load on the mandrel 50 when moving toward the retracted position. In some embodiments, the controller may operate the motor 30 at two different speeds. Alternatively, the time periods T1 and T2 can be varied in other ways. Retracting the mandrel 50 more quickly contributes to a short cycle time TC, which advantageously minimizes the time required to fully expand the PEX tubing to receive a fitting.

The expansion tool 10 continues the cycles of axially extending and retracting the mandrel 50. The operator pushes the jaws 218 deeper into the PEX tubing with each successive expansion until the sizing portion 226 is received within the PEX tubing. This indicates to the operator that expansion is complete (e.g., to a dimension D1). The jaws 218 are withdrawn from the PEX tubing, and the operator inserts a fitting into the end of the PEX tubing. The interior of the PEX tubing then elastically recovers and secures the fitting in place.

Various features and aspects of the present invention are set forth in the following claims.

What is claimed is:

1. An expansion tool comprising:
   a working element configured to expand an end of a tube, the working element including a plurality of jaws movable between a closed position and an expanded position;
   a first mandrel including a first contact surface; and
   a second mandrel coupled to the first mandrel, the second mandrel including a second contact surface;
   wherein the first mandrel and the second mandrel are movable together relative to the jaws in a first direction along an axis from a retracted position toward an extended position and in a second direction along the axis opposite the first direction from the extended position toward the retracted position, and
   wherein the first contact surface and the second contact surface are engageable with the jaws to move the jaws from the closed position toward the expanded position in response to movement of the first mandrel and the second mandrel from the retracted position toward the extended position.

2. The expansion tool of claim 1, wherein the first contact surface is spaced from the second contact surface along the axis.

3. The expansion tool of claim 1, wherein the jaws define an internal cavity when the jaws are in the closed position, and wherein the second mandrel is positioned entirely within the internal cavity when the first mandrel and the second mandrel are in the retracted position.

4. The expansion tool of claim 1, wherein the second mandrel includes a bore, and wherein a portion of the first mandrel extends into the bore.

5. The expansion tool of claim 1, wherein the expansion tool is configured to perform cycles of axially extending and retracting the first mandrel and the second mandrel, wherein the first mandrel and the second mandrel are movable from the retracted position to the extended position in a first time period, wherein the first mandrel and the second mandrel are movable from the extended position to the retracted position in a second time period, and wherein the first time period and the second time period collectively define a cycle time of the expansion tool.

6. The expansion tool of claim 5, wherein the first time period is longer than the second time period.

7. The expansion tool of claim 5, wherein the cycle time is one second or less.

8. The expansion tool of claim 1, wherein the first mandrel engages the second mandrel to move the second mandrel in the first direction.

9. The expansion tool of claim 1, further comprising:
a housing;
a motor supported by the housing;
a battery pack removably coupled to the housing, the battery pack configured to provide power to the motor; and
a drive mechanism configured to convert a rotational input from the motor into translational movement of the first mandrel between the extended position and the retracted position.

10. The expansion tool of claim 9, wherein the motor is operable in a first direction to move the first mandrel from the retracted position toward the extended position, and wherein the motor is operable in a second direction opposite the first direction to move the first mandrel from the extended position toward the retracted position.

11. The expansion tool of claim 1, wherein each jaw of the plurality of jaws includes a first tapered internal surface engageable with the first contact surface and a second tapered internal surface engageable with the second contact surface.

12. The expansion tool of claim 11, wherein the first contact surface is a tapered exterior surface of the first mandrel, and wherein the second contact surface is a tapered exterior surface of the second mandrel.

13. The expansion tool of claim 11, wherein the first tapered internal surface extends from a rear end of the jaw.

14. The expansion tool of claim 13, wherein the second mandrel extends beyond a front end of each jaw of the plurality of jaws when the first mandrel and the second mandrel are in the extended position.

15. The expansion tool of claim 1, wherein the first contact surface is defined by a tapered exterior surface of the first mandrel, and wherein the second contact surface is defined by a tapered exterior surface of the second mandrel.

16. The expansion tool of claim 1, wherein the working element is biased toward the closed position by a spring element.

17. The expansion tool of claim 1, wherein the plurality of jaws is configured to rotate about the axis.

18. The expansion tool of claim 1, wherein each jaw of the plurality of jaws includes a first tapered internal surface engageable with the first contact surface, and wherein the first tapered internal surface extends from a rear end of the jaw.

19. The expansion tool of claim 18, wherein each jaw of the plurality of jaws includes a second tapered internal surface engageable with the second contact surface, and wherein the second tapered internal surface is generally parallel to the first tapered internal surface.

20. An expansion tool comprising:
a working element configured to expand an end of a tube, the working element including a plurality of jaws movable between a closed position and an expanded position;
a first mandrel including a first contact surface; and
a second mandrel coupled to the first mandrel, the second mandrel including a second contact surface;
wherein the first contact surface and the second contact surface are engageable with the jaws to move the jaws from the closed position toward the expanded position in response to movement of the first mandrel and the second mandrel from a retracted position toward an extended position,
wherein the jaws define an internal cavity when the jaws are in the closed position, and
wherein the second mandrel is positioned entirely within the internal cavity when the first mandrel and the second mandrel are in the retracted position.

* * * * *